(12) United States Patent
Elder et al.

(10) Patent No.: US 12,439,998 B2
(45) Date of Patent: Oct. 14, 2025

(54) FOOTWEAR WITH EXTERNALLY-REINFORCED FLUID-FILLED BLADDER

(71) Applicant: NIKE, Inc., Beaverton, OR (US)

(72) Inventors: Zachary M. Elder, Portland, OR (US); Laura E. Flores Sandoval, Hillsboro, OR (US); Todd W. Miller, Portland, OR (US); Lee D. Peyton, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 163 days.

(21) Appl. No.: 18/315,371

(22) Filed: May 10, 2023

(65) Prior Publication Data

US 2023/0363495 A1    Nov. 16, 2023

Related U.S. Application Data

(60) Provisional application No. 63/488,755, filed on Mar. 6, 2023, provisional application No. 63/340,744, filed on May 11, 2022.

(51) Int. Cl.
| | | |
|---|---|---|
| *A43B 13/20* | (2006.01) | |
| *A43B 13/02* | (2022.01) | |
| *A43D 11/00* | (2006.01) | |

(52) U.S. Cl.
CPC .............. *A43B 13/20* (2013.01); *A43B 13/02* (2013.01); *A43D 11/00* (2013.01)

(58) Field of Classification Search
CPC ...... A43B 13/20; A43B 13/203; A43B 13/206
See application file for complete search history.

(56) References Cited

U.S. PATENT DOCUMENTS

| | | |
|---|---|---|
| 4,936,029 A | 6/1990 | Rudy |
| 5,042,176 A | 8/1991 | Rudy |
| 7,694,438 B1 * | 4/2010 | Christensen ........... A43B 3/246 36/29 |
| 11,044,964 B2 | 6/2021 | Meeker |
| 2005/0268487 A1 | 12/2005 | Ellis, III |
| 2009/0094856 A1 | 4/2009 | Guerra |

(Continued)

FOREIGN PATENT DOCUMENTS

| | | |
|---|---|---|
| EP | 3267828 A1 | 1/2018 |
| TW | 200528042 A | 9/2005 |

(Continued)

*Primary Examiner* — Ted Kavanaugh
(74) *Attorney, Agent, or Firm* — Quinn IP Law

(57) ABSTRACT

A cushioning structure includes an externally-reinforced bladder, the bladder having a first polymeric sheet and a second polymeric sheet, where each polymeric sheet includes an internal surface and an opposite external surface. A first reinforcing layer is in contact with the external surface of the first polymeric sheet, where the first reinforcing layer has a greater modulus than the first polymeric sheet. A second reinforcing layer is in contact with the external surface of the second polymeric sheet, where the second reinforcing layer has a greater modulus than the second polymeric sheet. The bladder includes an internal volume and a peripheral flange surrounding the internal volume, and the reinforcing layers are only secured to the polymeric sheets at the peripheral flange.

18 Claims, 5 Drawing Sheets

(56) References Cited

U.S. PATENT DOCUMENTS

| | | | |
|---|---|---|---|
| 2012/0102783 A1* | 5/2012 | Swigart | A43B 13/20 |
| | | | 12/146 B |
| 2013/0283640 A1* | 10/2013 | Elder | A43B 3/128 |
| | | | 36/102 |
| 2014/0020264 A1* | 1/2014 | Holt | A43B 13/04 |
| | | | 12/146 B |
| 2018/0213886 A1 | 8/2018 | Connell et al. | |
| 2018/0338578 A1* | 11/2018 | Elder | A43B 5/00 |
| 2019/0350311 A1 | 11/2019 | Davison | |
| 2019/0365037 A1 | 12/2019 | Forstrom et al. | |
| 2019/0365040 A1* | 12/2019 | Auyang | A43B 13/39 |
| 2020/0154825 A1* | 5/2020 | Case | A43B 21/28 |
| 2020/0154826 A1 | 5/2020 | Case et al. | |
| 2021/0353001 A1* | 11/2021 | Elder | A43B 13/20 |
| 2021/0368920 A1* | 12/2021 | Elder | A43B 13/023 |
| 2022/0202137 A1 | 6/2022 | Kiss | |

FOREIGN PATENT DOCUMENTS

| | | |
|---|---|---|
| TW | M559617 U | 5/2018 |
| TW | 202042692 A | 12/2020 |
| TW | 202112267 A | 4/2021 |
| TW | 202128045 A | 8/2021 |
| TW | 202133754 A | 9/2021 |
| TW | 202200040 A | 1/2022 |
| WO | 2014151186 A2 | 9/2014 |
| WO | 2017160962 A1 | 9/2017 |

\* cited by examiner

FOOTWEAR WITH EXTERNALLY-REINFORCED FLUID-FILLED BLADDER

CROSS REFERENCE TO RELATED APPLICATION

The present application claims the benefit of priority from U.S. Provisional Patent Application No. 63/340,744, filed 11 May 2022, and from U.S. Provisional Patent Application No. 63/488,755, filed 6 Mar. 2023, both of which are incorporated by reference in their entirety and for all that they disclose.

TECHNICAL FIELD

The present disclosure generally relates to cushioning structures which include an externally-reinforced bladder, including cushioning structures for an article of footwear, apparel or sporting equipment.

BACKGROUND

Cushioning structures are commonly used to provide cushioning in a variety of consumer goods, including in articles of footwear, apparel and sporting equipment. An article of footwear typically includes a sole structure configured to be located under a wearer's foot to space the foot away from the ground. Sole structures in athletic footwear are typically configured to provide cushioning, motion control, and/or resilience.

BRIEF DESCRIPTION OF THE DRAWINGS

The drawings described herein are for illustrative purposes only, are schematic in nature, and are intended to be exemplary rather than to limit the scope of the disclosure.

DESCRIPTION

Figure 1:
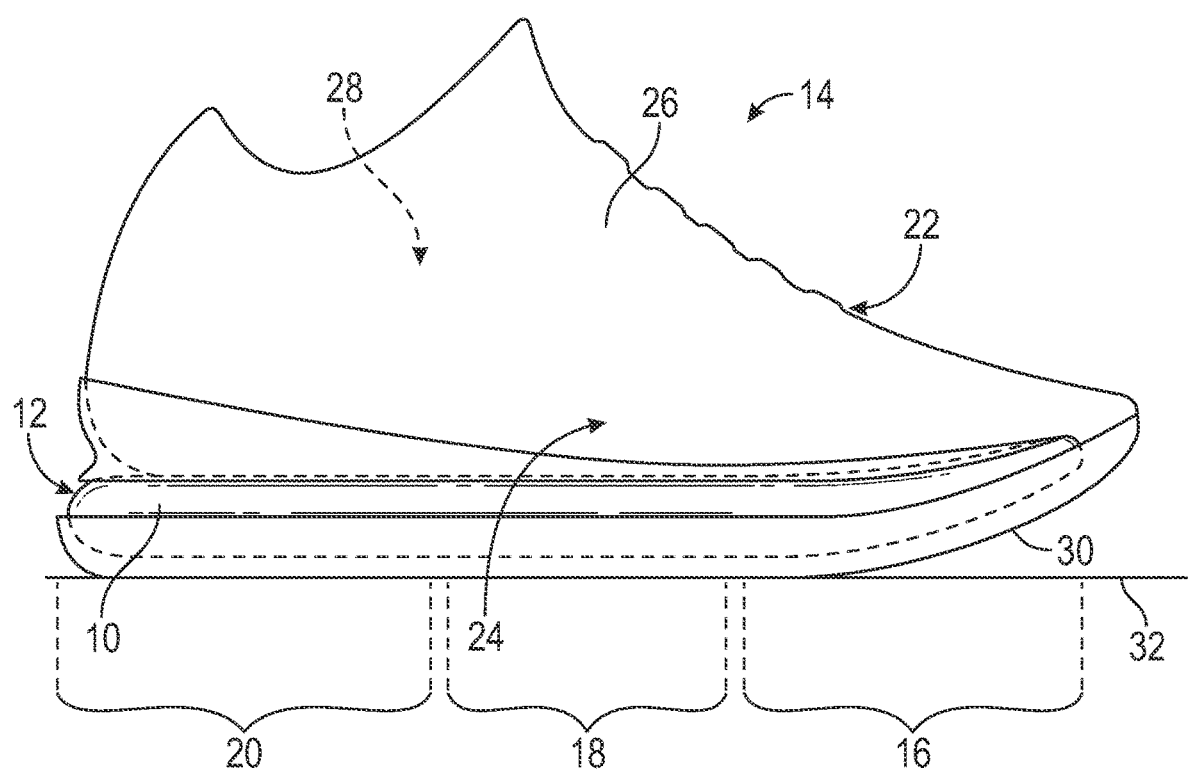
FIG. 1 is a schematic side view of an article of footwear with a sole structure having a fluid filled cushioning component extending across a portion of a heel region, a midfoot region, and a forefoot region.

The present disclosure generally relates to an article of footwear having a sole structure with at least one externally reinforced cushioning structure, such as an unfilled bladder or a fluid-filled bladder. As will be discussed below, the present designs utilize an external reinforcement layer to constrain and to provide structure to the more internally situated polymeric sheets that are operative to contain the pressurized fluid. The external reinforcement layer may include a plurality of filament or yarn strands that extend across the surface of the cushioning structure and are operative to resist fluid-induced elastic strain of the polymeric sheets. This external reinforcement layer may enable more direct and directional control over how the cushioning structure expands when inflated with a fluid or when placed under load. Likewise, the use of external reinforcement may enable the cushioning structure to achieve greater internal working pressures at a lower comparable weight than structures without the reinforcement layer. This may then result in larger dynamic energy returns to the wearer.

In general, the present external reinforcement designs may be used with cushioning structures comprising two or more stacked polymeric sheets that are selectively bonded together to define an internal volume that may then be inflated and sealed to form a fluid-filled bladder. The polymeric sheets may be bonded together, for example, by increasing the temperature of one or both of the polymeric sheets to or above its softening temperature, (such as by applying heat, ultrasonic energy, radio frequency energy, infrared energy, or any combination thereof, alone or with pressure, to one or both of the substantially planar sheets). For example, the heat or energy applied to one or both of the substantially planar sheets can be sufficient to soften one or both of the polymeric sheets, resulting in a thermal bond between the sheets (and between the sheets and any material(s) positioned between the sheets) once the softened polymeric sheet has re-solidified. Similarly, the heat or energy applied to one or both of the substantially planar sheets can be sufficient to melt at least a portion of one or both of the polymeric sheets to melt, resulting, when re-solidified, a particularly strong thermal bond in which adjacent polymeric materials at least partially fuse with each other, with entanglement of their polymer chains at the fused interface. In some embodiments, this thermal bonding process may occur via a particularly configured die that contacts the polymeric sheets only where the thermal bonds are desired. In other embodiments, a heat press may contact the entire sheet or substantially the entire sheet, while the internal bladder volumes may be formed by regionally inhibiting or blocking the sheets from thermally bonding where the internal volume is desired. In some embodiments, the thermal bonding may be prevented or greatly inhibited by printing or otherwise layering an anti-weld material, such as a "blocker ink", between adjacent surfaces of adjacent sheets. In doing so, applying heat, energy or pressure to the sheets may only thermally bond the sheets in areas where the anti-weld material is not present. By including the anti-weld material only in internal regions of the sheets (i.e., not extending to an outer perimeter of the sheet), the unbonded areas/interstitial spaces may be entirely enclosed such that they are capable of being inflated via introduction of a pressurized fluid. This inflation may cause a transverse separation of the sheets through an elastic expansion of the polymer sheet. It should be understood that other manners of bladder construction, such as thermoforming/vacuum forming, may similarly be used.

In general, the final geometry of the cushioning structure may be a function of both the material properties of the polymeric sheets, the presence and location any external reinforcing layers, and the location of inflatable volumes across the sheets (e.g., as may be caused via the placement/location of anti-weld material between the stacked sheets). More specifically, the resulting location and shape of the bonded areas will define the peripheral contours of the cushioning structure, including the number and existence of any internal chambers, and whether such chambers are in fluidic communication with each other.

In embodiments of the present cushioning structure construction, the one or more external reinforcement layers may be added to, or otherwise bonded to an exterior surface of, one or more of the polymeric sheets (or select portions thereof). In such embodiments, this external reinforcing layer may generally serve as a cage that supports and/or constrains the adjacent polymeric sheet as the sheet is elastically deformed when the internal pressure of the volume is increased. During use, this external reinforcement may have the effect of altering the final geometry and/or maximum inflation pressure of the cushioning structure, while also reducing the need for the polymeric sheet to have the intrinsic structure required to withstand the pressure. By varying the material, orientation, position, and density of the filaments or yarn strands within the reinforcing layer, the expansion/deformation of the sheets during the inflation process may be controlled and/or altered from a simple unreinforced structure.

In some embodiments, the external reinforcing layer or layers may be integrally attached/joined with the polymeric sheet(s) only within the bond areas where the sheets are thermally bonded together. In more central regions, such as the regions that form the internal chambers, the external reinforcing layer may be unattached (e.g., via direct bonding) and may float and/or may be held in place only via the more peripheral bond areas as well as the contact pressure between the reinforcing layer.

Referring to the drawings, wherein like reference numbers refer to like components throughout the views, FIG. 1 shows a fluid-filled bladder 10 that is included in a sole structure 12 of an article of footwear 14. The article of footwear 14 may include a forefoot region 16, a midfoot region 18, and a heel region 20, with the midfoot region 18 being located between the heel region 20 and the forefoot region 16. As is understood by those skilled in the art, the forefoot region 16 generally underlies the toes and metatarsal-phalangeal joints of an overlying foot, the midfoot region 18 generally underlies the arch region of the foot, and the heel region 20 generally underlies the calcaneus bone. The article of footwear 14 has a medial side 22 generally shaped to follow the medial side of a wearer's foot, and a lateral side 24 generally shaped to follow the lateral side of the wearer's foot (note that in FIG. 1, the medial side 22 is on the opposite side of the article 14 from what is visible—i.e., the lateral side 24).

In one configuration, a fluid-filled bladder 10, of the kind described herein, may be assembled as a midsole or a component of a midsole in the sole structure 12. For example, in one configuration, the bladder 10 may be a full-length bladder that extends across each of the forefoot region 16, midfoot region 18 and heel region 20. In some configurations, such a full-length bladder may serve as the entire midsole. In other embodiments, the bladder 10 may be a more discrete cushioning component and/or may comprise a plurality of bladders 10 and may be integrated with one or more foam components to form the midsole. In some examples, such discrete bladders may be located within the forefoot region 16 and/or the heel region 20, but may be omitted from the midfoot region 18.

The sole structure 12 is coupled to a footwear upper 26 that defines an internal foot-receiving cavity 28. Further, the sole structure 12 may include an outsole 30 or outsole surface that is intended to contact the ground or a ground surface 32 when the article 14 is worn by an individual during a normal stride (i.e., while walking or running).

Figure 2A:
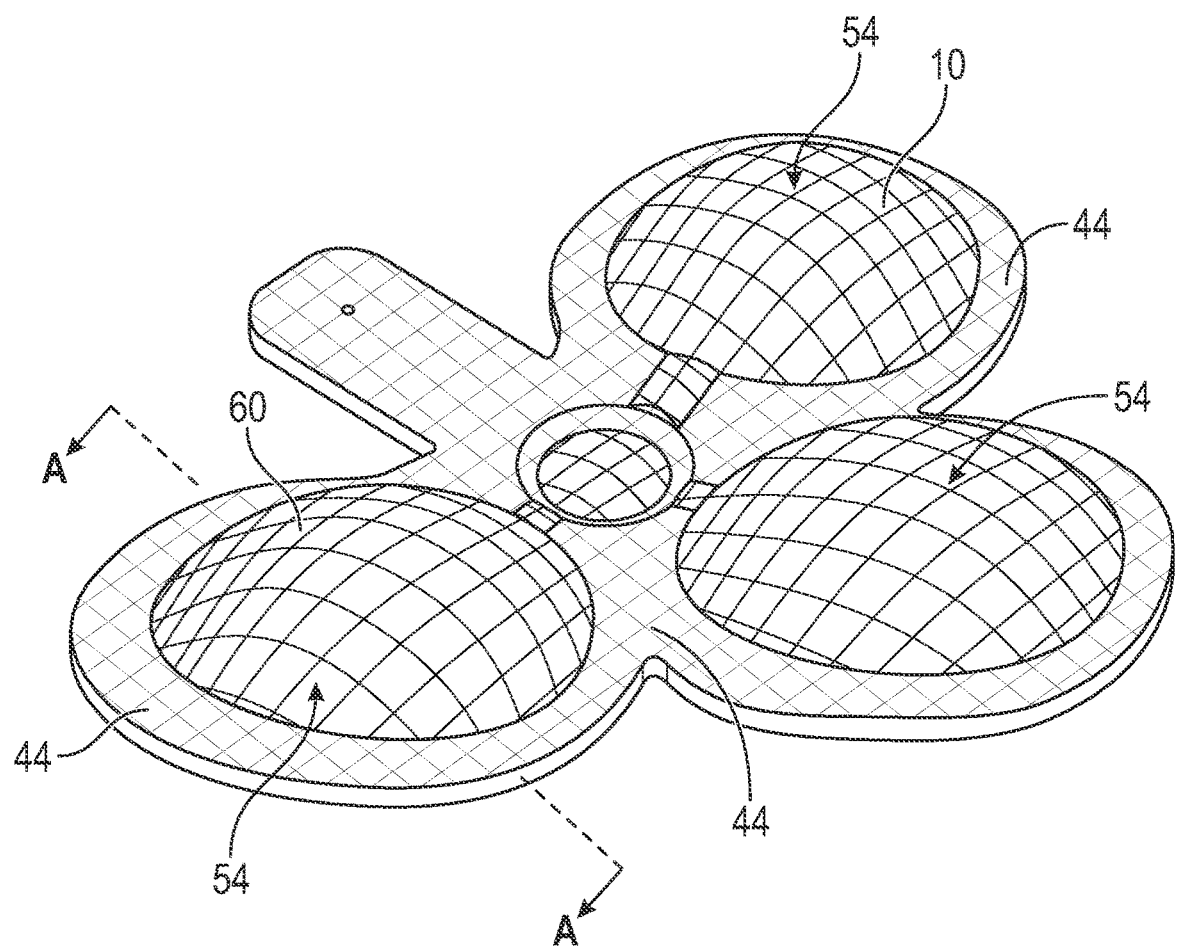
FIG. 2A is schematic perspective view of an externally-reinforced, fluid-filled bladder.
Figure 2B:
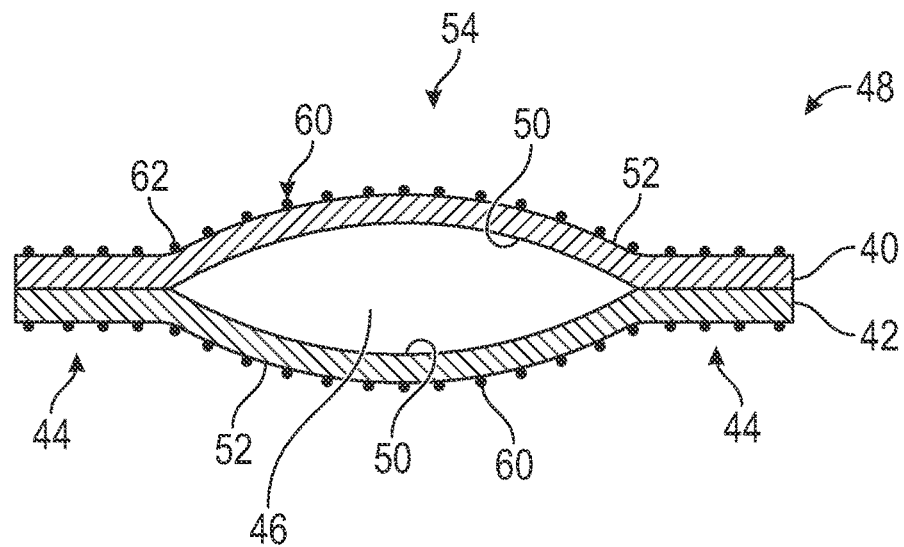
FIG. 2B is a schematic cross-sectional view of the externally-reinforced, fluid-filled bladder of FIG. 2A, taken along line A-A.

FIGS. 2A and 2B schematically illustrate one embodiment of an externally-reinforced, fluid-filled bladder 10 that may be used with the present disclosure. As shown, the bladder 10 may include or be formed between two or more polymeric sheets (e.g., a first polymeric sheet 40 and a second polymeric sheet 42) that are fused together at a peripheral flange 44 or bond area to define an internal volume 46 therebetween (such as shown in the cross-section 48 provided in FIG. 2B).

For ease of reference, each sheet 40, 42 may have what will be referred to as an internal surface 50 that directly defines/abuts the internal volume 46, and an opposite external surface 52 that has a surface normal extending away from the internal volume 46. The peripheral flange 44 may surround what will be referred to as the "inflatable portion 54" of each respective polymeric sheet 40, 42. As used herein, the inflatable portion 54 is the portion of the respective polymeric sheet that is encircled by the peripheral flange 44 and is separated from the opposing sheet by a distance to define the internal volume 46. It is this inflatable portion 54 that elastically deforms if/when the internal volume 46 is pressurized via an introduced fluid within the internal volume 46. In some embodiments, multiple internal volumes 46 may be formed between a single pair of polymeric sheets. In such an embodiment, each inflatable portion 54/internal volume 46 would still be surrounded by a peripheral flange 44 as this bond flange would still be peripheral to that volume—even if not at a periphery of the polymeric sheet.

As further illustrated, the bladder 10 may comprise one or more external reinforcing layers 60 that are in contact with the external surface 52 of one or both of the first polymeric sheet 40 and second polymeric sheet 42. The external reinforcing layer 60 may comprise a plurality of constituent reinforcing yarns or yarn strands 62 that are arranged in a unidirectional, multi-directional, woven, non-woven, knit, and/or randomized manner and that extend across some or all of the respective polymeric sheet.

As used herein, the term "filament" is understood to refer to a long or essentially continuous strand having a length several orders of magnitude greater than its diameter, and is understood to include fibers. A filament can be made from naturally occurring materials, or from man-made materials, such as synthetic or regenerated materials. The term "yarn" is understood to refer to a long or essentially continuous strand of fibers, or filament(s) in a form suitable for knitting, weaving, crocheting, braiding, or otherwise intertwining with other yarns or segments of the same yarn, or for use in sewing including embroidery. Types of yarns include continuous filament yarns, examples of which include monofilament yarns (consisting of a single continuous filament) and multi-filament yarns (consisting of a plurality of flat or textured filaments which are typically twisted or air-entangled with each other). Spun yarns are another type of yarn, which consist of a plurality of staple fibers (such as cotton or wool fibers) or cut fibers or filaments which are entangled with each other in the spinning process. Complex yarns are yet another type of yarn, which may consist of a cord or cabled yarn, or which may consist of two or more single yarn strands combined into a ply yarn. Natural fibers or filaments may be used, including naturally-occurring cellulosic fibers such as cotton or flax, naturally-occurring protein-based fibers or filaments such as wool or silk, and naturally-occurring mineral-based materials such as asbestos. Man-made fibers or filaments may be used, including man-made fibers or filaments made from inorganic materials such as glass or metals, as well as fibers or filaments made from regenerated natural polymers, including cellulose-based polymers and protein-based polymers, man-made carbon fibers or filaments, and man-made fibers or filaments made from synthetic polymers, i.e., the filament or yarn strand comprises a polymeric material comprising one or more synthetic polymers. In many cases, the synthetic polymers are thermoplastics (i.e., the filament or yarn strand is thermoplastic), including thermoplastic elastomers (i.e., the filament or yarn is thermoplastic and elastomeric), although thermosets such as elastane may also be used, in which case the filament or yarn is thermoset). A variety of synthetic polymers are commonly used to make fibers or filaments. The polymeric material of the filament or yarn can include polymer chosen from a polyester (such as polyethylene terephthalate (PET)), a polyamide (such as Nylon-6, Nylon 6,6, and Nylon-11), a polyolefin (such as a propylene homopolymer and copolymer, as well as an ethylene homopolymer and copolymers), and a polyacetate (such as cellulose acetate fibers), and any combination thereof. A polyurethanes, such as a thermoplastic polyurethane and including a thermoplastic elastomeric polyurethane, may also be used in the polymeric material. The filaments or yarn strands may comprise or consist of a filament or yarn including a natural material, a man-made or regenerated natural material, or a combination of both natural and man-made or regenerated materials, such as a spun yarn comprising a blend of cotton and polyester fibers, or a mixture of filaments including cotton fibers and polyester filaments. The filaments or yarn strands may comprise or consist of a multi-filament yarn comprising polyester or polyamide filaments, such as a commercially available embroidery thread. The filaments or yarn strands may comprise or consist of a bicomponent filament or yarn, such as a thermoplastic polyurethane sheath covering a polyester or polyamide core.

In many instances, the reinforcing filament or yarn strands 62 may comprise one or more polymeric materials that have a modulus that is greater than a corresponding modulus of the polymeric sheet material to which it is attached. While in some embodiments, high modulus filaments or yarn strands 62 may be used to effectively lock out or prevent any elastic strain in a given direction, in many embodiments the modulus of the filament or yarn strands 62 may be selected to only reduce the amount of permitted elastic strain under typical working pressures (while not eliminating it entirely). For example, in some embodiments, the modulus of the filament or yarn strands 62 may be between 1 and 50 times the modulus of the polymeric sheet alone. In other embodiments, the modulus of the filament or yarn strands 62 may be between 1 and 25×, or between 1 and 20×, or between 1 and 10×, or between 1 and 5× the modulus of the polymeric sheet alone. The filament or yarn strands 62 should also be flexible enough to permit repeated transverse bending without fracture. This flexibility is important both to permit the initial inflation of the bladder as well as to receive repeated compression during use. In some embodiments, each respective filament or yarn strand 62 may have an aspect ratio of length to diameter of at least 50 or at least 100 or at least 500 or even at least 1000. Said another way, the filament or yarn strands 62 may be continuous strands that may each extend across a portion of the final sheet and are not simply a fibrous filler mixed into a polymeric resin prior to forming the layer.

Figure 3:
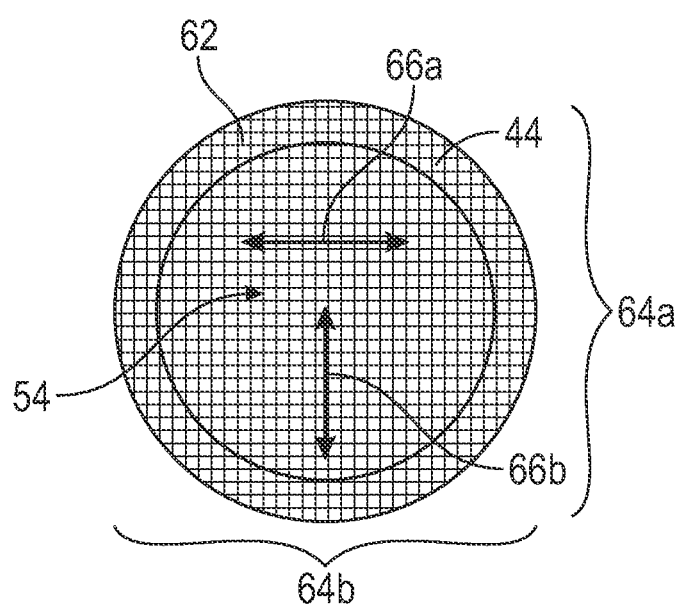
FIG. 3 is a schematic top view of an externally-reinforced, fluid-filled bladder.

In one configuration, the external reinforcing layer 60 may comprise a textile. The textile can be a non-woven textile comprising or consisting of the filament or yarn strands 62. The textile can be a non-woven textile consisting of thermoplastic filaments, such as a spunlace non-woven textile, a spun-bonded non-woven textile, a heat bonded non-woven textile, a meltblown non-woven textile, a needle-entangled or hydro-entangled non-woven textile, and the like. The textile can be a textile comprising or consisting of intertwined filament or yarn strands, such as a knitted, woven, crocheted or braided textile. In one aspect, the textile is a ripstop-type woven fabric. Ripstop fabrics are typically woven fabrics formed from a plurality of yarn strands that often comprise a polymeric material comprising a polyamide such as a polyamide (PA6). Ripstop fabrics typically include stronger and often thicker reinforcing yarns interwoven at regular intervals across the fabric. In some configurations, the external reinforcing layer 60 may comprise one or more subsets of unidirectional filament or yarn strands 62 (i.e., whether woven or not). As used herein, a subset of filament or yarn strands 62 is unidirectional if each constituent filament or yarn strand 62 has a substantially parallel orientation (i.e., where the orientation of a filament or yarn strand 62 is defined by its longitudinal central axis—generally viewed in a plan view and/or prior to inflation of the bladder 10). As shown in FIG. 3, in one configuration, the plurality of filament or yarn strands 62 may comprise a first subset 64a of unidirectional filament or yarn strands that extend in a first common direction 66a and a second subset 64b of unidirectional filament or yarn strands 62 extending in a second common direction 66b. The first common direction 66a may be oriented at an angle of between about 5 degrees and about 90 degrees relative to the second common direction 66b. In one configuration, these directions 66a, 66b may be approximately orthogonal prior to the direction the cushioning structure expands when inflated.

While FIG. 3 schematically illustrates only two sets of unidirectional filament or yarn strands 62 extending in two directions, it should be understood the strand arrangement is somewhat design driven and a cushioning structure could have 3 or 4 or 5 or even more sets of unidirectional filament or yarn strands 62, each having a unique orientation. Moreover, in some embodiments, filament or yarn strands 62 or sets of unidirectional filament or yarn strands 62 may be laid, intertwined, entangled, woven, wound, knit, crocheted or braided in predefined patterns.

When assembled, the plurality of filament or yarn strands 62 may extend across and be in contact with the external surface 52 of the inflatable portion 54 of a polymeric sheet 40, 42. In some embodiments, the plurality of filament or yarn strands 62 in contact with a respective polymeric sheet 40, 42 may be secured to that sheet only at the peripheral flange 44/bond area. Said another way, while the filament or yarn strands 62 may be in direct contact with the external surface 52 of the inflated portion 54 of a polymeric sheet 40, 42, within that region, they may be physically unattached to the sheet such that relative motion between the yarn strands 62 and the sheet is possible. Conversely, at the peripheral flange 44, the plurality of filament or yarn strands may be bonded, adhered, welded, and/or physically captured by polymeric sheet, for example by thermal bonding, such that relative movement is inhibited or prevented. In some embodiments, this bonding may occur via the same process that is used to bond the polymeric sheets 40, 42 together, such as by heat press or ultrasonic welding.

In one embodiment, the cushioning structures of the present disclosure may be formed through one or more thermoforming and/or vacuum forming processes whereby one or both polymeric sheets 40, 42 are drawn into a mold via the application of a positive pressure and/or vacuum pressure. Following this, opposing mold dies may urge the polymeric sheets into contact with each other while applying energy to thermally bond the sheets together. Either prior to the thermoforming, or immediately prior to the thermal bonding, the reinforcing layer may be introduced into the mold so that when the thermal bonding process occurs, the dies also thermally bond the filaments or yarns of the reinforcing layer to the polymeric sheets while creating the bonded peripheral flange.

Figure 4:
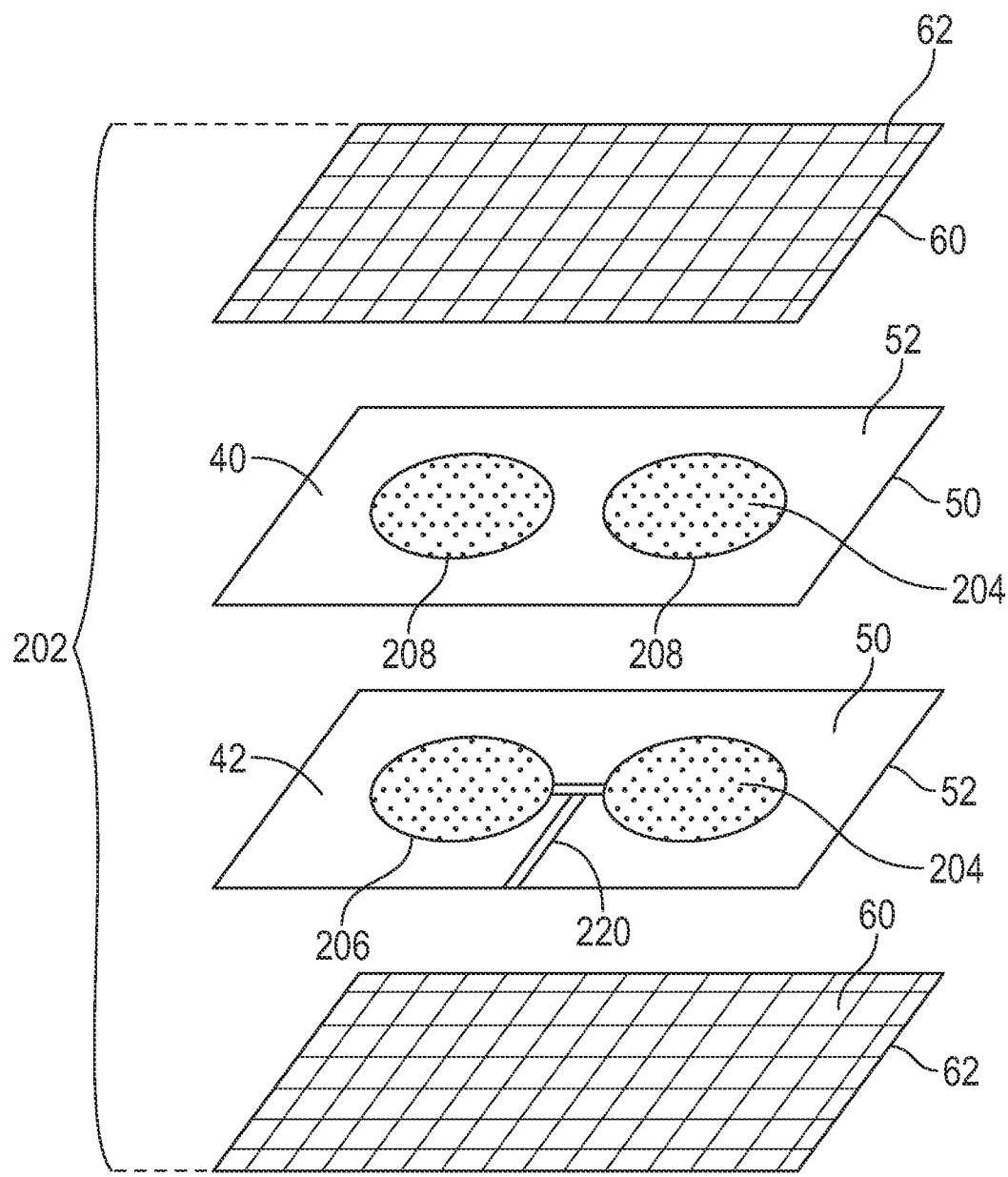
FIG. 4 is a schematic partially exploded view of a stacked assembly for forming an externally-reinforced, fluid-filled bladder using an anti-weld material to selectively inhibit layers from fusing together.

In another embodiment, such as generally illustrated in FIG. 4, the cushioning structure 10 may be formed in a substantially flat manner whereby all bonds are formed prior to the cushioning structure being inflated by filling it with a fluid. For example, in one configuration, the polymeric sheets 40, 42 used to form the cushioning structure 10 may layered as a stacked assembly 202 with an anti-weld material 204 applied to or printed on interfacing surfaces between adjacent sheets 40, 42. The anti-weld material may locally interfere with the ability for adjacent sheets to thermally bond together where the anti-weld material is present (for example, where the anti-weld material has been printed on adjacent internal sides of one or both of the polymer sheets), thus creating internal pockets where the polymer sheets do not thermally bond to each other, and which may subsequently be filled/pressurized with a working fluid. The anti-weld material 204 may comprise a material (such as a fluid or a flowable or printable material, e.g., a blocker ink) that is capable of being selectively deposited on a polymeric sheet 40, 42, such as, for example, via an inkjet style printer. Alternatively, the anti-weld material may comprise a solid which is capable of being selectively deposited on the polymeric sheet 40, 42 using a deposition process, such as a vapor-phase deposition process or an electrostatic deposition process. In such an example, a computer-controlled print head may selectively deposit/print the anti-weld material onto the internal surface 50 of the second polymeric sheet 42 according to a programmed pattern (e.g., a bitmap or along a vector-based path) where bonds between adjacent sheets are not desired. This specific pattern of the printed 206 of the anti-weld material 204 may give rise to the geometry of the internal chambers when the bladder 10 is ultimately inflated.

As further illustrated in FIG. 4, a reinforcing layer 60 comprising a plurality of filament or yarn strands 62 may be positioned on one or both sides of the polymeric sheets 40, 42 within the stacked assembly 202. In some embodiments, the anti-weld material 204 may further be disposed on exterior surfaces 52 of the polymeric sheets 40, 42 in a pattern 208 to prevent the reinforcing layer 60 from bonding with the polymer sheet if a uniform thermal bonding process is utilized. Such a process may be particularly needed if the filament or yarn strands 62 comprise a thermoplastic material, and a uniform heat-pressing process is performed. In this embodiment, the printed exterior surface pattern 208 may be coincident with the printed interior surface pattern 206 when assembled. This would prevent the reinforcing layer 60 from bonding to the polymeric sheets within the inflatable portion 54 of the bladder 10.

Once the full stack of alternating sheets and anti-weld material are prepared and assembled, the stacked assembly 202 may then be selectively and/or uniformly heat pressed to cause adjacent surfaces without anti-weld material to thermally bond together. As noted above, during this process, the anti-weld material 204 interferes with the ability for the sheets to thermally bond wherever the anti-weld material is placed. No specialized thermoforming molds or radio frequency welding would be necessary to form the bladder 10 according to this method. Likewise, if the stacked assembly 202 is uniformly heat pressed together (e.g., such as via a heated iron or planar press, there may be no need to re-tool or reconfigure a workstation to generate a different cushioning structure configuration. All that would need to occur would be to apply a different pattern of anti-weld material.

Once bonded, the stacked assembly 202 remains flat and takes on the contoured shape of the cushioning structure 10 only when the internal volumes 60, formed using the anti-weld material, are inflated by a fluid (e.g., an inflation gas) introduced via optional fill ports 220 (i.e., shown as regions in which anti-weld material 204 was applied in FIG. 4). Once the internal chambers are sufficiently inflated/pressurized, the fill ports 220 may be subsequently sealed to trap the fluid within the internal volume thus maintaining the inflated bladder shape. If the inflation gas is removed without sealing the fill ports 220, and assuming other components are not disposed in any of the sealed chambers, and the polymeric sheets 200 are not yet bonded to other components such as an outsole, other midsole layers, or an upper, the polymeric sheets 200 would likely return to their initial, flat state (assuming no creep or plastic strain results from the inflation).

In some aspects, the first polymeric sheet, the second polymeric sheet, or both the first and second polymeric sheets comprise a gas-barrier material, meaning that the sheets include a material having a low permeability to gas molecules having low molecular weights such as nitrogen gas, oxygen gas, carbon dioxide gas, and the like. A polymeric sheet comprising a gas-barrier material may include one or more layers of the gas-barrier material. In this design, the polymeric sheets 40, 42 may primarily serve the purpose of a gas-barrier membrane to contain the internal working gas/fluid, while the reinforcing layer may provide structure to these barrier membranes. In such a design, the polymeric sheets may consist of the barrier material, or may consist of layers of barrier material alternating with layers of a thermoplastic elastomer, without a layer of a more resilient material which substantially increases the strength, rigidity and durability of the polymer sheet. This design can be contrasted with prior cushioning structure constructions where the polymeric sheet needed to be formed with sufficient bulk and/or material strength to provide its own structure (e.g., by including thick structural layers formed of more resilient materials than the gas barrier material) while also resisting fluid diffusion. Said another way, in prior designs, the polymeric sheets needed to provide both a barrier structure and a structure providing strength, rigidity and durability to the sheet. In the present design, the strength, rigidity and durability function is largely provided by and performed by the reinforcing layer and filament or yarn strands 62 that extend across the inflatable portion, so, in some aspects, the polymer sheet need only act as the gas barrier.

Within the present designs, the polymeric sheets 40, 42 can comprise or consist of a polymeric material various polymers. The polymeric material of the polymeric sheets 40, 42 can be a thermoplastic material, such as a thermoplastic elastomeric material. The polymeric sheets 40, 42 can comprise a gas barrier material. The polymeric sheets 40, 42 can comprise a thermoplastic elastomeric material and a gas barrier material, and these two materials can be structured in the polymer sheet, for example, in alternating layers, to form a barrier membrane, such that the polymer sheet can resiliently retain a fluid such as air or another gas. In one aspect, the polymeric sheets 40, 42 used to form the airbags or bladders disclosed herein comprise or consist of a barrier membrane 240, such as shown in the schematic cross-sectional view in FIG. 2B. As used herein, a barrier membrane is understood to be a membrane having a relatively low rate of transmittance of a fluid. When used alone or in combination with other materials in an airbag or bladder, the barrier membrane resiliently retains the fluid. Depending upon the structure and use of the cushioning structure, the barrier membrane may retain the fluid at a pressure which is above, at, or below atmospheric pressure. In some aspects, the fluid is a liquid or a gas. Examples of gasses include air, oxygen gas ($O_2$), and nitrogen gas ($N_2$), as well as inert gasses. In one aspect, the barrier material of the barrier membrane is a nitrogen gas barrier material.

The gas transmission rate of the barrier membrane can be less than 4 or less than 3 or less than 2 cubic centimeters per square meter per atmosphere per day per day for a membrane having a thickness of from about 72 micrometers to about 320 micrometers, as measured at 23 degrees Celsius and 0 percent relative humidity. In another example, the gas transmission rate of the barrier membrane is from about 0.1 to about 3, or from about 0.5 to about 3, or from about 0.5 to about 3 cubic centimeters per square meter per atmosphere per day per day for a membrane having a thickness of from about 72 micrometers to about 320 micrometers, as measured at 23 degrees Celsius and 0 percent relative humidity. The gas transmission rate, such as the oxygen gas or nitrogen gas transmission rate, can be measured using ASTM D1434.

In one aspect, the barrier membrane may comprise a multi-layered film comprising a plurality of layers, the plurality of layers comprising one or more barrier layers, the one or more barrier layers comprising a barrier material, the barrier material comprising or consisting essentially of one or more gas barrier compounds. The multi-layered film comprises at least 5 layers or at least 10 layers. Optionally, the multi-layered film comprises from about 5 to about 200 layers, from about 10 to about 100 layers, from about 20 to about 80 layers, from about 20 to about 50 layers, or from about 40 to about 90 layers.

In one aspect, the barrier material comprises or consists essentially of one or more inorganic gas barrier compounds. The one or more inorganic gas barrier compounds can take the form of fibers, particulates, platelets, or combinations thereof. The fibers, particulates, platelets can comprise or consist essentially of nanoscale fibers, particulates, platelets, or combinations thereof. Examples of inorganic barrier compounds includes, for example, carbon fibers, glass fibers, glass flakes, silicas, silicates, calcium carbonate, clay, mica, talc, carbon black, particulate graphite, metallic flakes, and combinations thereof. The inorganic gas barrier component can comprise or consist essentially of one or more clays. Examples of suitable clays include bentonite, montmorillonite, kaolinite, and mixtures thereof. In one example, the inorganic gas barrier component consists of clay. Optionally, the barrier material can further comprise one or more additional ingredients, such as a polymer, processing aid, colorant, or any combination thereof. In aspects where the barrier material comprises or consists essentially of one or more inorganic barrier compounds, the barrier material can be described as comprising an inorganic gas barrier component consisting of all inorganic barrier compounds present in the barrier material. When one or more inorganic gas barrier compounds are included in the barrier material, the total concentration of the inorganic gas barrier component present in the barrier material can be less than 60 weight percent, or less than 40 weight percent, or less than 20 weight percent of the total composition. Alternatively, in other examples, the barrier material consists essentially of the one or more inorganic gas barrier materials.

In one aspect, the gas barrier compound comprises or consists essentially of one or more gas barrier polymers. The one or more gas barrier polymers can include thermoplastic polymers. In one example, the barrier material can comprise or consist essentially of one or more thermoplastic polymers, meaning that the barrier material comprises or consists essentially of a plurality of thermoplastic polymers, including thermoplastic polymers which are not gas barrier polymers. In another example, the barrier material comprises or consists essentially of one or more thermoplastic gas barrier polymers, meaning that all the polymers present in the barrier material are thermoplastic gas barrier polymers. The barrier material can be described as comprising a polymeric component consisting of all polymers present in the barrier material. For example, the polymeric component of the barrier material can consist of a single class of gas barrier polymer, such as, for example, one or more polyolefin, or can consist of a single type of gas barrier polymer, such as one or more ethylene-vinyl alcohol copolymers. Optionally, the barrier material can further comprise one or more non-polymeric additives, such as one or more filler, processing aid, colorant, or combination thereof.

Many gas barrier polymers are known in the art. Examples of gas barrier polymers include vinyl polymers such as vinylidene chloride polymers, acrylic polymers such as acrylonitrile polymers, polyamides, epoxy polymers, amine polymers, polyolefins such as polyethylenes and polypropylenes, copolymers thereof, such as ethylene-vinyl alcohol copolymers, and mixtures thereof. Examples of thermoplastic gas barrier polymers include thermoplastic vinyl homopolymers and copolymers, thermoplastic acrylic homopolymers and copolymers, thermoplastic amine homopolymers and copolymers, thermoplastic polyolefin homopolymers and copolymers, and mixtures thereof. In one example, the one or more gas barrier polymers comprise or consist essentially of one or more thermoplastic polyethylene copolymers, such as, for example, one or more thermoplastic ethylene-vinyl alcohol copolymers. The one or more ethylene-vinyl alcohol copolymers can include from about 28 mole percent to about 44 mole percent ethylene content, or from about 32 mole percent to about 44 mole percent ethylene content. In yet another example, the one or more gas barrier polymers can comprise or consist essentially of one or more one or more polyethyleneimine, polyacrylic acid, polyethyleneoxide, polyacrylamide, polyamidoamine, or any combination thereof.

The polymeric sheet of the present disclosure is elastomeric. In some aspects, the polymer sheet consists of one or more elastomeric materials, where the elastomeric materials individually include a polymeric component comprising or consisting of one or more elastomeric polymers, such as one or more thermoplastic elastomers. In other words, in some aspects, the polymer sheet includes one or more layers of elastomeric material, and is free of a gas barrier material as described herein. In other aspects, the polymer sheet is a multi-layered film including layers of a gas barrier material alternating with layers of an elastomeric material, where the elastomeric material includes a polymeric component comprising or consisting essentially of at least one elastomer. Many gas barrier compounds are brittle and/or relatively inflexible, and so the one or more barrier layers may be susceptible to cracking when subjected to repeated, excessive stress loads, such as those potentially generated during flexing and release of a multi-layered film. A multi-layered film which includes one or more barrier layers alternating with second layers of an elastomeric material results in a multi-layered film that is better able to withstand repeated flexing and release while maintaining its gas barrier properties, as compared to a film without the elastomeric second layers present.

The elastomeric material comprises or consists of a polymeric component, wherein the polymeric component comprises or consists essentially of one or more elastomers. In one aspect, the polymeric component of the elastomeric material comprises or consists essentially of one or more thermoplastic elastomers. The elastomeric material can be described as comprising a polymeric component consisting of all polymers present in the elastomeric material. In one example, the polymeric component of the elastomeric material consists of one or more elastomers. Optionally, the elastomeric material can further comprise one or more non-polymeric additives, such as fillers, processing aids, and/or colorants.

Many polymers which are suitable for use in the elastomeric material are known in the art. Exemplary polymers which can be included in the elastomeric material include polyolefins, polyamides, polycarbonates, polyimines, polyesters, polyacrylates, polyesters, polyethers, polystyrenes, polyureas, and polyurethanes, including homopolymers and copolymers thereof (e.g., polyolefin homopolymers, polyolefin copolymers, etc.), and combinations thereof. In one example, the elastomer material comprises or consists essentially of one or more polymers chosen from polyolefins, polyamides, polyesters, polystyrenes, and polyurethanes, including homopolymers and copolymers thereof, and combinations thereof. In another example, the polymeric component of the elastomer material consists of one or more thermoplastic polymers, or one or more elastomers or one or more thermoplastic elastomers, including thermoplastic vulcanizates. Alternatively, the one or more polymers of the elastomer material can include one or more thermoset or thermosettable elastomers, such as, for example, natural rubbers and synthetic rubbers, including butadiene rubber, isoprene rubber, silicone rubber, and the like.

Polyolefins are a class of polymers which include monomeric units derived from simple alkenes, such as ethylene, propylene and butene. The polymeric component of the elastomeric material can comprise or consist of one or more polyolefin elastomer, including one or more thermoplastic polyolefin elastomer. Examples of thermoplastic polyolefins include polyethylene homopolymers, polypropylene homopolymers polypropylene copolymers (including polyethylene-polypropylene copolymers), polybutene, ethylene-octene copolymers, olefin block copolymers; propylene-butane copolymers, and combinations thereof, including blends of polyethylene homopolymers and polypropylene homopolymers. Examples of polyolefin elastomers include polyisobutylene elastomers, poly(alpha-olefin) elastomers, ethylene propylene elastomers, ethylene propylene diene monomer elastomers, and combinations thereof.

Polyamides are a class of polymers which include monomeric units linked by amide bonds. Naturally-occurring polyamides include proteins such as wool and silk, and synthetic amides such as nylons and aramids. The one or more polymeric component of the elastomer material can include thermoplastic polyamides such as nylon 6, nylon 6-6, nylon-11, as well as thermoplastic polyamide copolymers. The polyamide can be a polyamide elastomer, such as a thermoplastic polyamide elastomer.

Polyesters are a class of polymers which include monomeric units derived from an ester functional group, and are commonly made by condensing dibasic acids such as, for example, terephthalic acid, with one or more polyols. In one example, the second material can comprise or consist essentially of one or more thermoplastic polyester elastomers. Examples of polyester polymers include homopolymers such as polyethylene terephthalate, polybutylene terephthalate, poly-1,4-cyclohexylene-dimethylene terephthalate, as well as copolymers such as polyester polyurethanes. The polymeric component of the elastomeric material can comprise or consist of a polyester elastomer, such as a thermoplastic polyester elastomer.

Styrenic polymers are a class of polymers which include monomeric units derived from styrene. The one or more second polymers can comprise or consist essentially of styrenic homopolymers, styrenic random copolymers, styrenic block copolymers, or combinations thereof. Examples of styrenic polymers include styrenic block copolymers, such as acrylonitrile butadiene styrene block copolymers, styrene acrylonitrile block copolymers, styrene ethylene butylene styrene block copolymers, styrene ethylene butadiene styrene block copolymers, styrene ethylene propylene styrene block copolymers, styrene butadiene styrene block copolymers, and combinations thereof. The polymeric component of the elastomeric material can comprise or consist of a styrenic elastomer, such as a thermoplastic styrenic elastomer.

Polyurethanes are a class of polymers which include monomeric units joined by carbamate linkages. Polyurethanes are most commonly formed by reacting a polyisocyanate (e.g., a diisocyanate or a triisocyanate) with a polyol (e.g., a diol or triol), optionally in the presence of a chain extender. The monomeric units derived from the polyisocyanate are often referred to as the hard segments of the polyurethane, while the monomeric units derived from the polyols are often referred to as the soft segments of the polyurethane. The hard segments can be derived from aliphatic polyisocyanates, or from organic isocyanates, or from a mixture of both. The soft segments can be derived from saturated polyols, or from unsaturated polyols such as polydiene polyols, or from a mixture of both. When the multi-layered film is to be bonded to natural or synthetic rubber, including soft segments derived from one or more polydiene polyols can facilitate bonding between the rubber and the film when the rubber and the film are crosslinked in contact with each other, such as in a vulcanization process. The polymeric component of the elastomeric material can comprise or consist of a polyurethane elastomer, such as a thermoplastic polyurethane elastomer.

The barrier membranes, including the barrier membranes of the multi-layered films, have an overall thickness of from about 40 micrometers to about 500 micrometers, or about 50 micrometers to about 400 micrometers, or about 60 micrometers to about 350 micrometers. In one aspect, each individual layer of the plurality of layers of the multi-layered film has a thickness of from about 0.001 micrometers to about 10 micrometers. For example, the thickness of an individual barrier layer can range from about 0.001 micrometers to about 3 micrometers thick, or from about 0.5 micrometers to about 2 micrometers thick, or from about 0.5 micrometers to about 1 micrometer thick. The thickness of an individual second layer can range from about 2 micrometers to about 8 micrometers thick, or from about 2 micrometers to about 4 micrometers thick. A thickness of the films and/or their individual layers can be measured by any method known in the art such as, for example, ASTM E252, ASTM D6988, ASTM D8136, or using light microscopy or electron microscopy.

The polymer sheets, including the multi-layered films, have a Shore hardness of from about 35 A to about 95 A, optionally from about 55 A to about 90 A. Hardness can be measured using ASTM D2240 using the Shore A scale.

When a co-extrusion process is used to form the polymer sheet, such as when a barrier membrane is formed from a plurality of alternating barrier layers and second layers, the barrier material can have a melt flow index of from about 5 to about 7 grams per 10 minutes at 190 degrees Celsius when using a weight of 2.16 kilograms. The elastomeric material, when used alone or in conjunction with a barrier material, can have a melt flow index of from about 20 to about 30 grams per 10 minutes at 190 degrees Celsius when using a weight of 2.16 kilograms. In a further aspect, when a layered film comprising a barrier material is used, the melt flow index of the barrier material can be from about 80 percent to about 120 percent of the melt flow index of the elastomeric material per 10 minutes when measured at 190 degrees Celsius when using a weight of 2.16 kilograms. In these aspects, melt flow index can be measured using ASTM D1238. Alternatively or additionally, the barrier material or the elastomeric material or both have a melting temperature of from about 165 degrees Celsius to about 183 degrees Celsius, or from about 155 degrees Celsius to about 165 degrees Celsius. The barrier material can have a melting temperature of from about 165 degrees Celsius to about 183 degrees Celsius. The elastomeric material can have a melting temperature of from about 155 degrees Celsius to about 165 degrees Celsius. Melting temperature can be measured using ASTM D3418.

In some embodiments, the reinforcing filament or yarn strands 62 may be formed from a polymeric material comprising a polymer chosen from a polyamide, a polyester, a polyurethane, a polyolefin, and combinations thereof. In other embodiments, the filament or yarn strands 62 may comprise carbon fibers, glass spun fibers, and the like. The filament or yarn strands 62 can be selected to meet certain minimum durability requirements given the expected use.

While it is possible for each constituent filament or yarn strand 62 to be individually laid down, manufacturing efficiency and production cycle time may be improved if the filament or yarn strands 62 are collectively positioned across the polymeric sheet. Collective positioning may be accomplished through the use of unidirectional plies, layups formed from a plurality of unidirectional plies (i.e., each having a different common orientation), textiles, including non-woven textiles, woven fabrics, knit fabrics, crocheted fabrics, and the like. In some embodiments, to promote bonding with the polymeric sheets 40,42 the filament or yarn strands 62 of the reinforcing layer may be coated or impregnated with a thermoplastic material prior to being thermally bonded to the polymeric sheets.

In some embodiments, the filament or yarn strands 62 may exhibit non-linear stretch profiles such that the effective modulus of the filament or yarn strands 62 significantly increases after some amount of strain. These filament or yarn strands 62 may include filament or yarn strands 62, or configurations of filament or yarn strands 62 having non-linear elasticities, filaments or yarns with very low or no elongation, coiled filaments or yarns, loosely woven or knit yarns and the like. With a nonlinear stretch profile, the cushioning structure 10 may more easily inflate during an initial introduction of pressurized fluid, but once the threshold inflation has been reached, the properties of the filament or yarn strands 62 or of the configuration of the filaments or yarn strands 62 may engage or stiffen and aid in the cushioning structure resisting further inflation.

In some embodiments, in addition to structurally reinforcing the cushioning structure, the reinforcing layers may be used to aid in affixing the cushioning structure to adjacent components. For example, in one configuration, the filament or yarn strands 62, or a textile comprising the filament or yarn strands 62, may be used to affix the cushioning structure to an adjacent component. For example, the filament or yarn strands 62 or textile comprising the filament or yarn strands 62 can be used to thermally bond or to knit, weave, or stitch the cushioning structure to another component, such as an adjacent textile.

When inflated, the cushioning structure may expand at least in part as a function of the material elasticity of the polymeric sheet. If the external reinforcing layer 60 is oriented to provide the sheet with a substantially isotropic in-plane elastic modulus, then the dimensional expansion of the cushioning structure should be approximately uniform and symmetric, such as shown in FIGS. 2A and 2B. In such an embodiment, the final geometry of the bladder 10 may be similar to a bladder that omits the filament or yarn strands 62, however, the internal fluid pressure required to achieve an equal or similar transverse deformation would be increased as the modulus of the polymeric material would also be increased. For example, in a non-reinforced design, the maximum working pressure of the cushioning structure may be approximately 15 to 20 psi, whereas, in the reinforced configuration, the working pressure to achieve a similar shape may be approximately 40 to 50 psi. At the higher working pressures, the cushioning structure may more efficiently return energy to a wearer of an article of footwear including the cushioning structure, during actions such as running, jumping, or cutting where a dynamic impact load is applied to the bladder 10.

While the ability to achieve increased working pressures is one benefit of external reinforcement, in other embodiments, the spacing, placement, and/or elasticity of the constituent yarn strands 62 may be used to alter the inflation dynamics and/or final geometry of the bladder. More specifically, by applying the reinforcing layer to only select regions of the polymeric sheet, the modulus of elasticity in those regions may be increased, which could result in greater localized working pressures or comparatively less inflation displacement than in areas lacking the reinforcement layer. Further, by controlling the direction of the filaments or yarn strands 62, anisotropic inflation/stretch dynamics may be introduced.

Figure 5A:
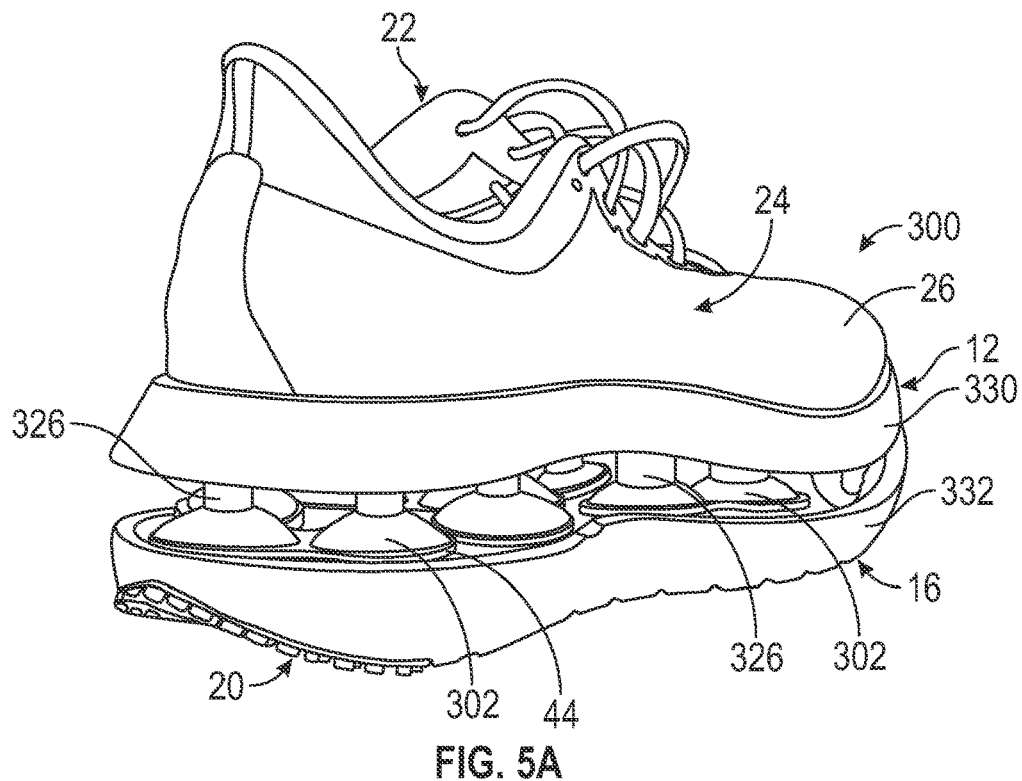
FIG. 5A is a schematic rear-side perspective view of an article of footwear that includes a sole structure having a plurality of discrete fiber-reinforced bladders.
Figure 5B:
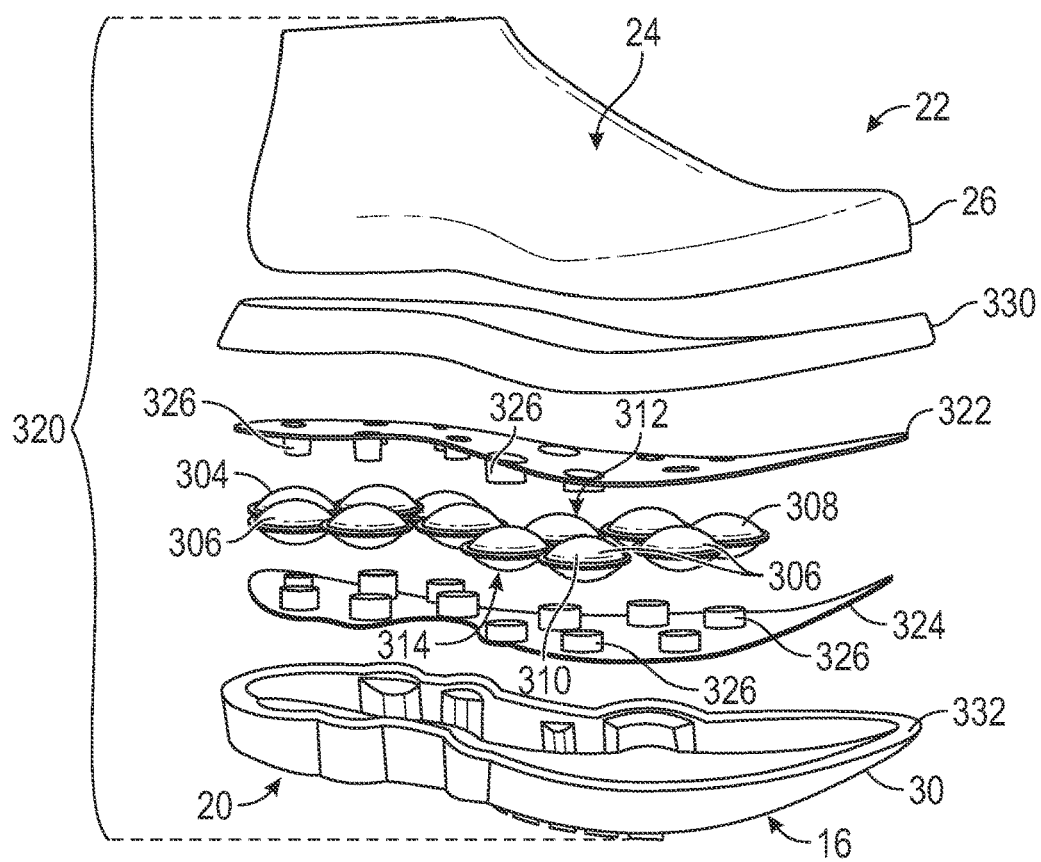
FIG. 5B is a schematic exploded view of the article of footwear of FIG. 5A.

FIGS. 5A and 5B schematically illustrate an article of footwear 300 with a sole structure 12 having a plurality of discrete, reinforced bladders 302. In the embodiment shown, three pods of fluidly connected chambers are provided. A first bladder pod 304 with six discrete chambers 306 is provided in the heel region 20 of the sole structure 12, a second bladder pod 308 with three chambers 306 is provided in the forefoot region 16 on a medial side 22 of the sole structure 12, and a third bladder pod 310 with three chambers 306 is provided in the forefoot region 16 on a lateral side 24 of the sole structure 12. In this design, each chamber 306 may be externally-reinforced outside of both an upper surface/upper-most polymeric sheet 312 and on a lower surface/lower-most polymeric sheet 314.

As best illustrated in the schematic exploded view 320 provided in FIG. 16B, each of the three bladder pods 304, 308, 310 may be disposed between an upper plate 322 and a lower plate 324. These plates 322, 324 have sufficient rigidity to induce a compression of the respective bladder chambers when a dynamic compression/impact load is applied via a wearer's foot. In this embodiment, each pod may maintain a static pressure of between about 30 psi and about 60 psi. In some embodiments, to concentrate the compressive load on each chamber 306 even more, each chamber 306 may be mounted between opposing posts 326. Each post 326 may have a diameter (or more generally a perimeter) that is smaller than a corresponding diameter (or perimeter) of the chamber 306. In some embodiments, the diameter or perimeter of the post 326 may be less than about 70% of the diameter or perimeter of the chamber 306. In other embodiments, the diameter or perimeter of the post 326 may be less than about 50% of the diameter or perimeter of the chamber 306. While posts are not strictly required to utilize these designs, as the internal pressure of the bladder increases, a load-concentrating/pressure increasing feature may be desirable to increase the amount of compressive deformation during an impact.

In the design provided in FIGS. 5A and 5B, the sole structure 12 may further include one or both of an upper midsole cushioning component 330 between the upper plate 322 and the upper 26, and a lower midsole cushioning component 332 between the lower plate 324 and the outsole 30. These midsole cushioning components 330, 332 may be formed from a foamed, polymeric material that is selected to dampen impact forces while ideally returning energy to the wearer's foot upon rebounding from the impact. Referring again to FIG. 5A, in some embodiments, the lower and/or upper posts 326 may be at least partially hidden from sight by recessing the respective plate 322, 324 into the upper/lower midsole cushioning component 330, 332. In the embodiment shown, the lower plate 324 is recessed into the lower midsole cushioning component 332 to the point where the bonding flange 44 of the bladder is about flush with the top of the lower midsole cushioning component 332.

While the prior disclosure has generally focused on integrating a plurality of reinforcing fibers into the polymeric sheets that form the bladder, in some embodiments additional films or sheets with linear or non-linear stiffnesses may be locally or regionally provided in a similar manner to alter dimensional stiffnesses in the polymeric sheet.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending along a length of a component. For example, a longitudinal direction of a shoe extends between a forefoot region and a heel region of the shoe. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending along a width of a component. For example, a transverse direction of a shoe extends between a lateral side and a medial side of the shoe. The transverse direction or axis may also be referred to as a lateral direction or axis or a mediolateral direction or axis.

The term "vertical" refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the shoe is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the shoe in an assembled shoe. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

The following clauses present various embodiments of the present technology and are intended to be read in light of the preceding disclosure and figures.

Clause 1. A cushioning structure comprising: an externally-reinforced bladder comprising: a first polymeric sheet and a second polymeric sheet, each polymeric sheet including an internal surface and an opposite external surface, a first reinforcing layer in contact with the external surface of the first polymeric sheet, the first reinforcing layer having a greater modulus than the first polymeric sheet; and a second reinforcing layer in contact with the external surface of the second polymeric sheet, the second reinforcing layer having a greater modulus than the second polymeric sheet; and wherein the bladder includes: one or more chambers in which the internal surface of the first polymeric sheet is spaced from the internal surface of the second polymeric sheet to define an internal volume between the first polymeric sheet and the second polymeric sheet; one or more bonding regions in which the internal surface of the first polymeric sheet is in contact with and bonded to the internal surface of the second polymeric in a peripheral region that surrounds the internal volume, the peripheral region forming a peripheral flange; wherein, in the bladder, the first reinforcing layer is bonded to the first polymeric sheet only at the peripheral flange; and the second reinforcing layer is bonded to the second polymeric sheet only at the peripheral flange.

Clause 2. The cushioning structure of clause 1, further comprising: an anti-weld material disposed between the first polymeric sheet and the second polymeric sheet within a central region of the first polymeric sheet and the second polymeric sheet, the anti-weld material operative to inhibit the first polymeric sheet from being able to thermally fuse with the second polymeric sheet wherever the anti-weld material is present;

Clause 3. The cushioning structure of clause 1, further comprising a fluid provided within the internal volume, and wherein the fluid is pressurized to a relative pressure of from about 20 psi to about 60 psi.

Clause 4. The cushioning structure of clause 1, wherein the first polymeric sheet includes a first inflatable portion and the second polymeric sheet includes a second inflatable portion, wherein the internal volume is formed between the first inflatable portion and the second inflatable portion, and wherein the peripheral flange surrounds both the first inflatable portion and the second inflatable portion; wherein the first reinforcing layer contacts the first inflatable portion but is not directly bonded to the first inflatable portion; and wherein the second reinforcing layer contacts the second inflatable portion but is not directly bonded to the second inflatable portion. Clause 5. The cushioning structure of clause 1, wherein the first reinforcing layer and the second reinforcing layer each comprise a plurality of filaments or yarn strands, and wherein each filament or yarn strand is bonded to the peripheral flange.

Clause 6. The cushioning structure of clause 5, wherein the plurality of filament or yarn strands comprises a first set of unidirectional filament or yarn strands each extending in a first direction and a second set of unidirectional filament or yarn strands each extending in a second direction that is different than the first direction.

Clause 7. The cushioning structure of clause 6, wherein the first reinforcing layer comprises a woven textile including a first set of unidirectional yarn strands woven with a second set of unidirectional yarn strands.

Clause 8. The cushioning structure of clause 1, wherein each of the first polymeric sheet and the second polymeric sheet comprise a thermoplastic material, the thermoplastic material comprising one or more thermoplastic polymers.

Clause 9. The cushioning structure of clause 8, wherein the first reinforcing layer and the second reinforcing layer each comprise a plurality of filaments or yarn strands; wherein each individual filament or yarn strand of the plurality of filaments or yarn strand is bonded to the peripheral flange; and wherein the each individual filament or yarn strand of the plurality of yarn strands comprises a thermoplastic material.

Clause 10. The cushioning structure of clause 9, wherein the each individual filament or yarn strand of the plurality of yarn strands is thermoplastic, or is thermoplastic and elastomeric.

Clause 11. The cushioning structure of clause 1, further comprising a non-foamed, polymeric upper plate provided on a first side of the bladder and a non-foamed polymeric lower plate provided on an opposite, second side of the bladder; wherein each of the upper plate and the lower plate are in contact with the bladder and operative to apply a compressive load to the bladder.

Clause 12. The cushioning structure of clause 11, wherein the upper plate comprises an upper plate portion and a first pressure increasing protrusion, wherein the first pressure increasing protrusion extends from the upper plate portion toward the lower plate and into contact with the central region of the first polymeric sheet; and wherein the lower plate comprises a lower plate portion and a second pressure increasing protrusion, wherein the second pressure increasing protrusion extends from the lower plate portion toward the upper plate and into contact with the central region of the second polymeric sheet; and wherein the first and second pressure increasing protrusions are operative to impinge into the bladder when a compressive load is applied between the upper plate and the lower plate.

Clause 13. The cushioning structure of clause 12, further comprising a polymeric foam cushioning element in contact with the upper plate on an opposite side of the plate from the bladder.

Clause 14. The cushioning structure of clause 1, further comprising an anti-weld material between the external surface of the first polymeric sheet and the first reinforcing layer, and between the external surface of the second polymeric sheet and the second reinforcing layer.

Clause 15. The cushioning structure of clause 1, wherein the cushioning structure is a cushioning structure for an article of apparel or sporting equipment.

Clause 16. The cushioning structure of clause 1, wherein the cushioning structure is a sole structure for an article of footwear, or is a component of a sole structure of an article of footwear.

Clause 17. An article of footwear, apparel or sporting equipment comprising the cushioning structure of any of clauses 1-17.

Clause 18. A method of manufacturing a cushioning structure, the method comprising: forming an externally-reinforced bladder by assembling a stack comprising a first polymeric sheet, a second polymeric sheet, a first reinforcing layer, and a second reinforcing layer, wherein, in the assembled stack, each polymeric sheet including an internal surface and an opposite external surface; the first reinforcing layer is in contact with the external surface of the first polymeric sheet, the first reinforcing layer having a greater modulus than the first polymeric sheet; the second reinforcing layer is in contact with the external surface of the second polymeric sheet, the second reinforcing layer having a greater modulus than the second polymeric sheet; and bonding together the layers of the assembled stack into the externally-reinforced bladder, wherein the externally-reinforced bladder includes one or more chambers in which the internal surface of the first polymeric sheet is spaced from the internal surface of the second polymeric sheet to define an internal volume between the first polymeric sheet and the second polymeric sheet; one or more bonding regions in which the internal surface of the first polymeric sheet is in contact with and bonded to the internal surface of the second polymeric in a peripheral region that surrounds the internal volume, the peripheral region forming a peripheral flange; wherein, in the externally-reinforced bladder, the first reinforcing layer is bonded to the first polymeric sheet only at the peripheral flange; and the second reinforcing layer is bonded to the second polymeric sheet only at the peripheral flange.

Clause 19. The method of clause 18, wherein the step of bonding comprises thermally bonding by softening or melting the first polymeric sheet, the second polymeric sheet, or both the first and the second polymeric sheet.

Clause 20. The method of clause 18, wherein the cushioning structure is a cushioning structure for an article of footwear, apparel or sporting equipment.

What is claimed is:

1. A cushioning structure comprising:
   an externally-reinforced bladder comprising:
      a first polymeric sheet and a second polymeric sheet, each polymeric sheet including an internal surface and an opposite external surface,
      a first reinforcing layer in contact with the external surface of the first polymeric sheet, the first reinforcing layer having a greater modulus of elasticity than the first polymeric sheet; and
      a second reinforcing layer in contact with the external surface of the second polymeric sheet, the second reinforcing layer having a greater modulus of elasticity than the second polymeric sheet; and
   wherein the bladder includes:
      one or more internal volumes in which the internal surface of the first polymeric sheet is spaced from the internal surface of the second polymeric sheet to define the internal volume between the first polymeric sheet and the second polymeric sheet;
      one or more peripheral flanges in which the internal surface of the first polymeric sheet is in contact with and bonded to the internal surface of the second polymeric sheet and wherein each of the one or more peripheral flanges surround a respective one of the one or more internal volumes;
   wherein each of the first polymeric sheet and second polymeric sheet includes a respective central region surrounded by the peripheral flange
   wherein the first reinforcing layer comprises a first plurality of filaments or yarn strands that are in contact with the central region of the first polymeric sheet though are not directly bonded to the central region of the first polymeric sheet;
   wherein the second reinforcing layer comprises a second plurality of filaments or yarn strands that are in contact with the central region of the second polymeric sheet though are not directly bonded to the central region of the second polymeric sheet;
   wherein the first reinforcing layer is bonded to the first polymeric sheet only at the peripheral flange; and
   wherein the second reinforcing layer is bonded to the second polymeric sheet only at the peripheral flange.

2. The cushioning structure of claim 1, further comprising:
   an anti-weld material disposed between the first polymeric sheet and the second polymeric sheet within a central region of the first polymeric sheet and the second polymeric sheet, wherein the central region of the first polymeric sheet is aligned with the central region of the second polymeric to define the internal volume therebetween, and wherein the anti-weld material being operative to inhibit the first polymeric sheet from thermally fusing with the second polymeric sheet wherever the anti-weld material is present.

3. The cushioning structure of claim 1, further comprising a fluid provided within the internal volume, and wherein the fluid is pressurized to a relative pressure of from about 20 psi to about 60 psi.

4. The cushioning structure of claim 1, wherein the plurality of filament or yarn strands comprises a first set of unidirectional filament or yarn strands each extending in a first direction and a second set of unidirectional filament or yarn strands each extending in a second direction that is different than the first direction.

5. The cushioning structure of claim 4, wherein the first reinforcing layer comprises a woven textile including the first set of unidirectional yarn strands woven with the second set of unidirectional yarn strands.

6. The cushioning structure of claim 1, wherein the first polymeric sheet comprises a first thermoplastic material, the second polymeric sheet comprises a second polymeric material; and
wherein the first thermoplastic material is the same as the second thermoplastic material or wherein the first thermoplastic material is different than the second thermoplastic material.

7. The cushioning structure of claim 6, wherein the first reinforcing layer and the second reinforcing layer each comprise a plurality of filaments or yarn strands;
wherein each individual filament or yarn strand of the plurality of filaments or yarn strand is bonded to the peripheral flange; and
wherein the each individual filament or yarn strand of the plurality of yarn strands comprises a thermoplastic material.

8. The cushioning structure of claim 7, wherein each individual filament or yarn strand of the plurality of yarn strands is thermoplastic, or is thermoplastic and elastomeric.

9. The cushioning structure of claim 1, further comprising a polymeric upper plate provided on a first side of the bladder and a non-foamed polymeric lower plate provided on an opposite, second side of the bladder;
wherein each of the upper plate and the lower plate are in contact with the bladder and operative to apply a compressive load to the bladder.

10. The cushioning structure of claim 9, wherein the upper plate comprises an upper plate portion and a first pressure increasing protrusion, wherein the first pressure increasing protrusion extends from the upper plate portion toward the lower plate and into contact with the central region of the first polymeric sheet; and
wherein the lower plate comprises a lower plate portion and a second pressure increasing protrusion, wherein the second pressure increasing protrusion extends from the lower plate portion toward the upper plate and into contact with the central region of the second polymeric sheet; and
wherein the first and second pressure increasing protrusions are operative to impinge into the bladder when a compressive load is applied between the upper plate and the lower plate.

11. The cushioning structure of claim 10, further comprising a polymeric foam cushioning element in contact with the upper plate on an opposite side of the plate from the bladder.

12. The cushioning structure of claim 1, further comprising an anti-weld material between the external surface of the first polymeric sheet and the first reinforcing layer, and between the external surface of the second polymeric sheet and the second reinforcing layer.

13. The cushioning structure of claim 1, wherein the cushioning structure is a cushioning structure for an article of apparel or sporting equipment.

14. The cushioning structure of claim 1, wherein the cushioning structure is a sole structure for an article of footwear, or is a component of a sole structure of an article of footwear.

15. A method of manufacturing a cushioning structure, the method comprising:
forming an externally-reinforced bladder by
assembling a stack comprising a first polymeric sheet, a second polymeric sheet, a first reinforcing layer, and a second reinforcing layer, wherein, in the assembled stack, each polymeric sheet including an internal surface and an opposite external surface;
the first reinforcing layer is in contact with the external surface of the first polymeric sheet, the first reinforcing layer having a greater modulus of elasticity than the first polymeric sheet;
the second reinforcing layer is in contact with the external surface of the second polymeric sheet, the second reinforcing layer having a greater modulus of elasticity than the second polymeric sheet; and
bonding together the layers of the assembled stack into the externally-reinforced bladder, wherein the externally-reinforced bladder includes
one or more internal volumes in which the internal surface of the first polymeric sheet is spaced from the internal surface of the second polymeric sheet to define the internal volume between the first polymeric sheet and the second polymeric sheet;
one or more peripheral flanges in which the internal surface of the first polymeric sheet is in contact with and bonded to the internal surface of the second polymeric sheet and wherein each of the one or more peripheral flanges surround a respective one of the one or more internal volumes;
wherein each of the first polymeric sheet and second polymeric sheet includes a respective central region surrounded by the peripheral flange
wherein the first reinforcing layer comprises a first plurality of filaments or yarn strands that are in contact with the central region of the first polymeric sheet though are not directly bonded to the central region of the first polymeric sheet;
wherein the second reinforcing layer comprises a second plurality of filaments or yarn strands that are in contact with the central region of the second polymeric sheet though are not directly bonded to the central region of the second polymeric sheet;
wherein the first reinforcing layer is bonded to the first polymeric sheet only at the peripheral flange; and
the second reinforcing layer is bonded to the second polymeric sheet only at the peripheral flange.

16. The method of claim 15, wherein the step of bonding comprises thermally bonding by softening or melting the first polymeric sheet, the second polymeric sheet, or both the first and the second polymeric sheet.

17. The method of claim 15, wherein the cushioning structure is a cushioning structure for an article of footwear, apparel or sporting equipment.

18. An article of footwear comprising:
an upper adapted to be secured about a foot of a wearer; and
a sole structure coupled with the upper, the sole structure including a cushioning structure, the cushioning structure comprising:
an externally-reinforced bladder comprising:
a first polymeric sheet and a second polymeric sheet, each polymeric sheet including an internal surface and an opposite external surface,
a first reinforcing layer in contact with the external surface of the first polymeric sheet, the first reinforcing layer having a greater modulus of elasticity than the first polymeric sheet; and a second reinforcing layer in contact with the external surface of the second polymeric sheet, the second reinforcing layer having a greater modulus of elasticity than the second polymeric sheet; and wherein the bladder includes:

one or more internal volumes in which the internal surface of the first polymeric sheet is spaced from the internal surface of the second polymeric sheet to define the one or more internal volumes between the first polymeric sheet and the second polymeric sheet;

one or more peripheral flanges in which the internal surface of the first polymeric sheet is in contact with and bonded to the internal surface of the second polymeric sheet and wherein each of the one or more peripheral flanges surround a respective one of the one or more internal volumes;

wherein each of the first polymeric sheet and second polymeric sheet includes a respective central region surrounded by the peripheral flange wherein the first reinforcing layer comprises a first plurality of filaments or yarn strands that are in contact with the central region of the first polymeric sheet though are not directly bonded to the central region of the first polymeric sheet;

wherein the second reinforcing layer comprises a second plurality of filaments or yarn strands that are in contact with the central region of the second polymeric sheet though are not directly bonded to the central region of the second polymeric sheet;

wherein the first reinforcing layer is bonded to the first polymeric sheet only at the peripheral flange; and wherein the second reinforcing layer is bonded to the second polymeric sheet only at the peripheral flange.

* * * * *